United States Patent
Bolton et al.

(10) Patent No.: US 7,914,933 B2
(45) Date of Patent: Mar. 29, 2011

(54) PROCESS AND APPARATUS FOR PRODUCING HYDROGEN

(75) Inventors: Leslie William Bolton, Fleet (GB); William Terence Woodfin, North Waltham (GB)

(73) Assignee: GM Global Technology Operations LLC, Detroit, MI (US)

( * ) Notice: Subject to any disclaimer, the term of this patent is extended or adjusted under 35 U.S.C. 154(b) by 1605 days.

(21) Appl. No.: 10/480,346

(22) PCT Filed: May 29, 2002

(86) PCT No.: PCT/GB02/02522
§ 371 (c)(1),
(2), (4) Date: Jun. 4, 2004

(87) PCT Pub. No.: WO02/102708
PCT Pub. Date: Dec. 27, 2002

(65) Prior Publication Data
US 2004/0209131 A1  Oct. 21, 2004

(30) Foreign Application Priority Data

Jun. 16, 2001 (GB) ................... 0114793.3

(51) Int. Cl.
*H01M 8/04* (2006.01)
*H01M 8/18* (2006.01)
*C01B 3/22* (2006.01)
*C01B 3/24* (2006.01)

(52) U.S. Cl. ............... 429/420; 423/648.1; 423/650; 423/651; 423/652; 429/423; 429/424; 429/425

(58) Field of Classification Search .................... 429/17, 429/19, 20, 420, 423, 424, 425; 423/648.1, 423/650, 651, 652
See application file for complete search history.

(56) References Cited

U.S. PATENT DOCUMENTS

| | | |
|---|---|---|
| 5,861,137 A | 1/1999 | Edlund |
| 6,162,267 A | 12/2000 | Priegnitz et al. |
| 6,348,278 B1 * | 2/2002 | LaPierre et al. ............ 429/17 |

FOREIGN PATENT DOCUMENTS

| | | |
|---|---|---|
| EP | 0 199 878 A | 11/1986 |
| EP | 1 094 031 A | 4/2001 |

OTHER PUBLICATIONS

International Search Report for PCT/GB02/02522; ISA/EPO; Date of Mailing: Sep. 24, 2002.

* cited by examiner

*Primary Examiner* — Wayne Langel
(74) *Attorney, Agent, or Firm* — Harness, Dickey & Pierce, P.L.C.

(57) ABSTRACT

A process and apparatus for producing hydrogen for a fuel cell by (a) reacting a fuel comprising a hydrocarbon and/or an oxygenate with steam, under steam reforming conditions in a reforming reactor to produce a product stream comprising hydrogen, (b) feeding at least part of the hydrogen produced in step a) to a fuel cell, to produce electric power and a waste stream comprising hydrogen, (c) reacting at least part of the waste stream from step b) with an oxygen-containing gas in a combustion reactor, and (d) using the heat energy produced in step c) to supply energy to the steam reforming reaction in step a) in which the combustion reactor is positioned within the reforming reactor to facilitate heat transfer between the stages.

14 Claims, 2 Drawing Sheets

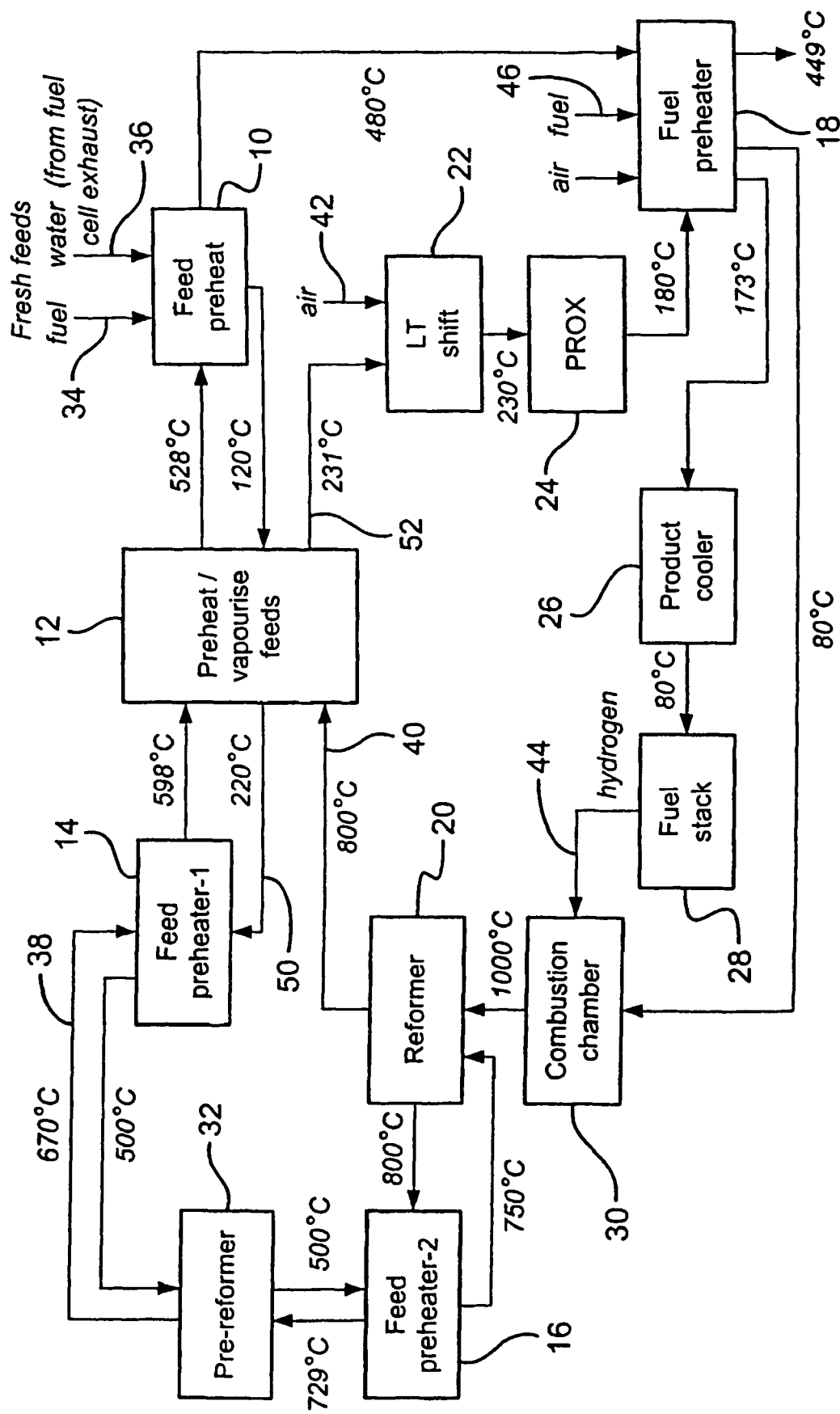
Fig. 1 Steam reformer based fuel processor - flowscheme.

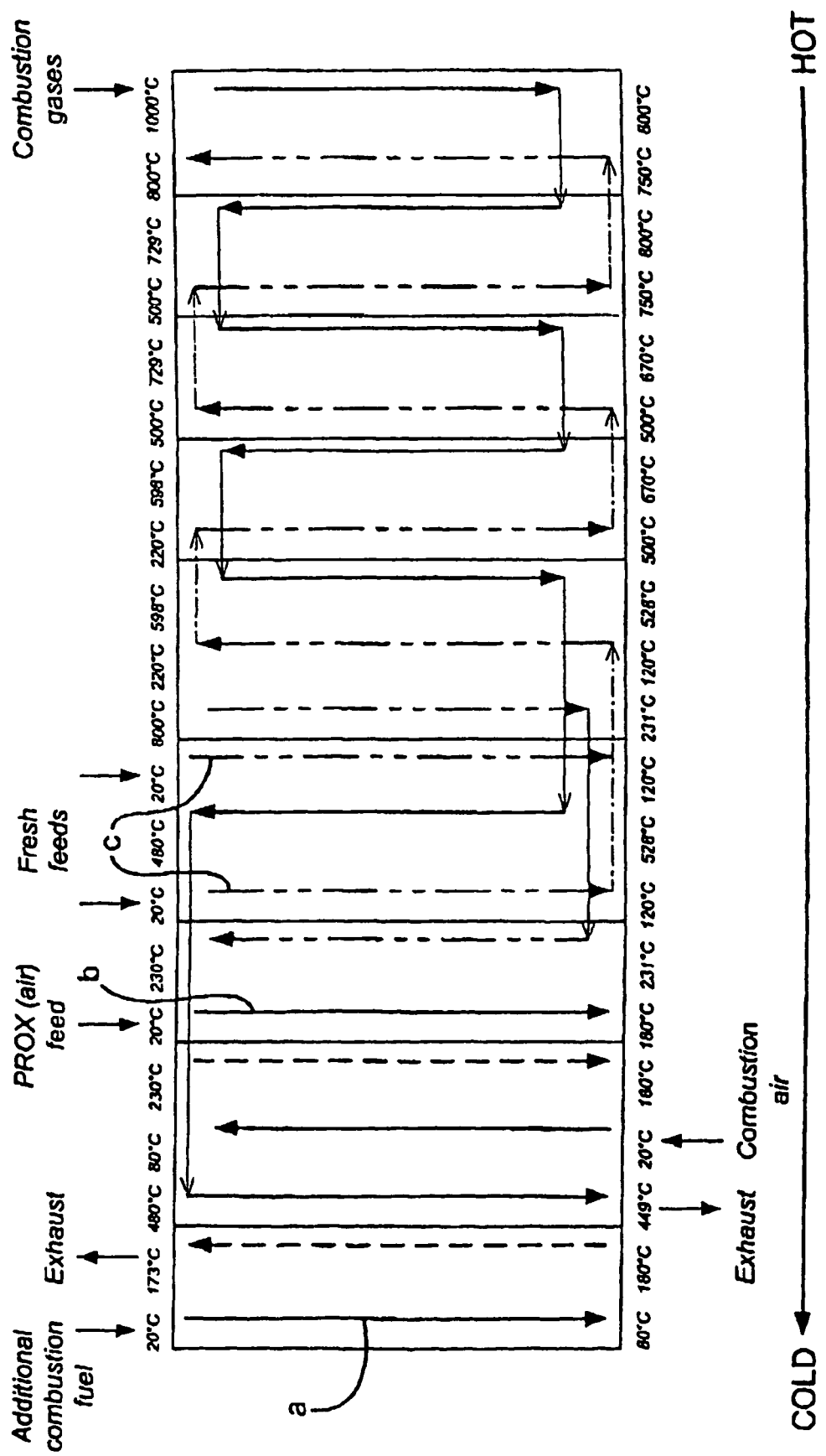

PROCESS AND APPARATUS FOR PRODUCING HYDROGEN

The present invention relates to a process and apparatus for producing hydrogen and in particular, for producing hydrogen for a fuel cell.

A fuel cell is an electrochemical device that combines hydrogen and oxygen to produce electricity. A fuel cell operates without combustion, making it a clean and reliable source of energy. For this reason, there is a growing interest in the use of fuel cell as a source of power for vehicles.

The hydrogen employed in a fuel cell can be stored directly, or produced in-situ, for example, by reforming a fuel composition comprising a hydrocarbon and/or an oxygenate, such as methanol. In steam reforming, for example, hydrocarbon or oxygenate may be reacted with steam to produce synthesis gas, a mixture of hydrogen and carbon monoxide. The hydrogen may be separated from the synthesis gas mixture, and used as a fuel for generating hydrogen for the fuel cell.

Although steam reforming is an effective way of producing hydrogen, it is an endothermic process. This means that energy has to be supplied to the reaction, for it to occur. Typically, this energy is supplied by reacting a portion of the hydrocarbon or oxygenate with air, to produce a product mixture including carbon monoxide, carbon dioxide, water and hydrogen. Although this reaction is significantly exothermic, large quantities of air must be employed to ensure that sufficient energy is generated to meet the needs of the steam-reforming step. Air contains large amounts of nitrogen, which remains inert during the reaction. The large volumes of air employed in the reaction, make significant demands on the components of the reforming apparatus, in terms of size and complexity. Additionally, the large amount of energy required to compress such large volumes of air means that the reforming step is conventionally carried out close to atmospheric pressure, despite the fact that high pressures may improve the yield of hydrogen.

It is known from U.S. Pat. No. 4,365,006 to generate heat in a burner supplied with anode exhaust gas which might be used to apply heat to a fuel conditioner comprising a steam reformer. It is known from U.S. Pat. No. 4,585,708 to burn anode and cathode gases to produce heat for a reformer. However, the there is no disclosure of relative positioning of burner and reformer.

It is among the objects of embodiments of the present invention to provide an a process and apparatus which has efficient heat integration.

According to the present invention, there is provided a process for producing hydrogen for a fuel cell, said process comprising:
a) reacting a fuel comprising a hydrocarbon and/or an oxygenate with steam, under steam reforming conditions in a reforming reactor to produce a product stream comprising hydrogen,
b) feeding at least part of the hydrogen produced in step a) to a fuel cell, to produce electric power and a waste stream comprising hydrogen,
c) reacting at least part of the waste stream from step b) with an oxygen-containing gas in a combustion reactor, and
d) using the heat energy produced in step c) to supply energy to the steam reforming reaction in step a)
characterised in that the combustion reactor is positioned within the reforming reactor.

Advantages of this process are that heat losses to atmosphere are reduced and the process is thermally efficient.

Preferably, the combustion reactor is positioned concentrically within the reforming reactor.

Any hydrocarbon and/or oxygenate may be employed as a fuel in step a). Where a hydrocarbon fuel is employed, the fuel may be gaseous or liquid. Suitable gaseous hydrocarbon fuels include bio gas and natural gas. Such gaseous fuels may comprise alkanes, for example, $C_1$ to $C_6$ alkanes such as methane, ethane, propane, butane, pentane and hexane. The alkanes employed may be linear or branched. The gaseous hydrocarbon fuel may comprise a mixture of alkanes.

Suitable liquid hydrocarbon fuels include liquefied petroleum gas (LPG), gasoline, paraffin and naphtha. Such liquid fuels may comprise alkanes, for example, $C_3$ to $C_{12}$ alkanes such as propane, butane, pentane, hexane, heptane, octane, nonane, decane, undecane and dodecane. The alkanes employed may be linear or branched. A preferred example of a suitable alkane is one having the formula:

$$R-CH_2-CH(CH_3)-C(CH_3)_2-CH_3 \qquad 1$$

wherein R is hydrogen or, preferably, methyl. When R is hydrogen, the alkane represented by Formula 1 is called triptane. The liquid hydrocarbon fuel may comprise a mixture of alkanes.

Suitable oxygenate fuels include alcohols, for example, as $C_1$ to $C_4$ alcohols such as methanol, ethanol, propanol and butanol. Alternatively, oxygenates such as ethers may be employed. Suitable ethers include mono- and di-ethers such as dimethyl ether and dimethoxymethane. Where an oxygenate fuel is employed, it is preferably methanol. A mixture of oxygenate and hydrocarbon fuel may be employed.

Advantageously, any impurities, such as sulfur present in the fuel may be removed prior to step a). Any suitable desulfurising method may be employed; for example, the fuel may be passed through a sulfur trap, or may be treated by hydrodesulfurization.

Step a) may be carried out under any suitable steam reforming conditions. For example, a steam reforming catalyst may be employed. Suitable steam reforming catalysts are well known in the art. These include transition metal catalysts, such as rhodium, nickel, cobalt, platinum, palladium, ruthenium and iridium. The catalyst may be supported or unsupported.

Suitable steam reforming temperatures range from 700 to 1000° C., preferably, 750 to 900° C. and more preferably, 775 to 825° C. Suitable steam reforming pressures range from 1 to 30 bara, preferably, 1 to 20 bara., more preferably, 2 to 15 bara, even more preferably, 3 to 12 bara, for example, 5 to 10 bara. An advantage of preferred embodiments of the present invention is that the steam reforming step may be carried out at greater than atmospheric pressure. This is because it is not necessary to partially combust the original feed prior to introducing it into the steam reformer, in order to generate sufficient heat for the reforming reaction. As a result, the volume of air entering the steam reformer may be reduced. Therefore, the energy required to compress the contents of steam reformer is reduced, allowing high pressure conditions to be employed at lower cost.

The water employed in the steam reforming step (a) may be provided at least in part, from the fuel cell cathode exhaust. Alternatively or additionally, the water employed in step a) may be provided from the product stream of step c).

As mentioned above, the hydrocarbon and/or oxygenate fuel is reacted with steam in step a), to produce a product stream comprising hydrogen. The product stream typically comprises synthesis gas, which contains carbon monoxide and/or carbon dioxide in addition to hydrogen. Methane may also be present in the product stream. Where carbon monoxide is produced, it may be reacted with an oxygen-containing gas (such as air) to produce carbon dioxide. This oxidation step is exothermic, and the energy produced may be used as a source of energy for the steam reforming step (a), or any other endothermic reaction involved in the overall process.

Alternatively or additionally, any carbon monoxide produced in the steam reforming step (a) may be reacted with steam, under water shift conditions to produce carbon dioxide and hydrogen. The hydrogen produced may be used to fuel the fuel cell.

Any energy released during the water shift reaction may be used as a source of energy for the steam reforming step (a), or any other endothermic reaction involved in the process. The water shift reaction (also known as the "water gas shift reaction" or "shift reaction") may be carried out using any suitable catalyst. Such catalysts are known, and include metal oxides such as copper oxide, zinc oxide iron oxide and/or chromic oxide. Suitable water shift temperatures range from 180 to 450C, preferably, 200 to 250C. Suitable water shift pressures range from 1 to 30 bara, preferably, 1 to 10 bara.

In certain embodiments of the invention, a portion of the product stream from step a) may be contacted with an oxygen-containing gas, under partial oxidation conditions. Under such conditions, the carbon monoxide is oxidized in preference to the hydrogen. The partially oxidized product may comprise hydrogen and carbon dioxide. The hydrogen produced may be used to fuel the fuel cell. Any energy released may be used as a source of energy for the steam reforming step (a), or any other endothermic reaction involved in the process.

The hydrogen produced in the steam reforming step (a) is introduced to the fuel cell in step b). This hydrogen may be supplemented with the hydrogen produced, for example, in the optional water-shift reaction and/or partial oxidation step. The hydrogen feed to the fuel cell may comprise by volume, at least 70% hydrogen, preferably, at least 80%, more preferably, at least 90% hydrogen. For certain applications, substantially pure hydrogen may be required. For example, the hydrogen stream may comprise by volume at least 95% hydrogen, preferably, at least 98% hydrogen and more preferably, at least 99% hydrogen. The hydrogen stream may be purified to appropriate levels by any known purification technique, examples of which are disclosed in WO 00/78443.

In a preferred embodiment of the invention, the hydrogen is purified using one or more membranes before it is introduced into the fuel cell. Membranes are particularly effective for purifying hydrogen-containing streams which are at relatively high pressures, as large pressure drops across the membrane ensure that purification takes place at an enhanced rate. Thus, membranes may be particularly useful for purifying hydrogen-containing streams emerging, for example, from a steam-reformer operated at pressures in excess of 2 bara, for example, 5 bara or more.

In the fuel cell, part of the hydrogen introduced into the fuel cell is combined with oxygen to produce water, and electric power. Fuel cells, however, are not 100% efficient, and some of the hydrogen remains unreacted. This unreacted hydrogen is removed from the fuel cell, as a waste stream from the anode. This waste stream is reacted with an oxygen-containing gas in step c) to generate heat and water. In certain embodiments, methane may be present in the waste stream. Thus, the reaction of step c) may also generate carbon dioxide. Suitable oxygen-containing gases include oxygen and air. The heat generated by this combustion step (c) is used as a source of energy for the steam reforming step (a). Advantageously, the water produced in step c) may also be used in the steam reformer.

In certain embodiments of the invention, it is desirable to pre-treat the hydrocarbon and/or oxygenate prior to the steam reforming step (a). Such pre-treatment may involve heating the fuel to a temperature of 300 to 700° C., preferably, 450 to 550° C. This may be achieved by heating the fuel directly using an external heat source, such as a burner or electric heat source. Alternatively, or additionally the fuel may be heated using the heat generated by any of the exothermic reactions involved in the overall process. Examples of exothermic reactions include step c), the oxidation of carbon monoxide, the reaction of carbon monoxide with water under water shift conditions, and the partial oxidation of part of the product stream of step a).

In addition or as an alternative to heating the fuel, the fuel may also be subjected to a pre-reforming step. This converts any high hydrocarbons and any carbon monoxide present in the feed to methane. Thus, the feed may be heated to higher temperatures without the potential for cracking and coke formation within the process. As with the heating step described above, the energy for such a pre-reforming step may also be provided by any of the exothermic reactions involved in the overall process.

The hydrogen produced using the present invention may be fed directly to a fuel cell. Alternatively or additionally, the hydrogen may be fed to a storage system (for example a tank and/or a metal hydride storage system) for storage until required. The hydrogen storage system may subsequently be connected to a fuel cell.

The process of the present invention may be carried out on a fuel cell powered vehicle. Alternatively, the process may be carried out at a stationary depot.

According to a further aspect of the present invention, there is provided an apparatus for producing hydrogen for a fuel cell, said apparatus comprising:

i) a reforming reactor having an inlet and an outlet, said inlet being connectable to a source of reactant, and said outlet being connectable to a fuel cell, said reforming reactor being further provided with beat transfer means, and ii) a combustion reactor having an inlet and an outlet, said inlet being connectable to a fuel cell, and said outlet being connectable to said heat transfer means, such that product from the combustion reactor may be passed through the beat transfer means to provide heat to the reforming reactor characterised in that the combustion reactor is positioned within the reforming reactor.

Preferably, the combustion reactor is positioned concentrically within the reforming reactor.

In use, a reactant feed comprising a hydrocarbon and/or an oxygenate and steam is introduced into the reforming reactor via the inlet. The reforming reactor is operated under steam reforming conditions to produce a product stream comprising hydrogen. At least part of the hydrogen produced in the reforming reactor is passed to a fuel cell. The fuel cell (or fuel cell stack) converts the hydrogen to water, generating electric power in the process. As the fuel cell is not 100% efficient with respect to the conversion of hydrogen, a waste stream comprising hydrogen is also produced. At least part of this waste stream is fed to the combustion reactor, where it is reacted with an oxygen-containing gas. This latter reaction is exothermic, and the exhaust stream emerging from the combustion reactor is hot. Thus, the exhaust stream is passed through the heat exchange means, so as to heat the contents of the reforming reactor. In passing through the heat exchange means, the exhaust stream drops in temperature. The cooled exhaust stream may be allowed to leave the apparatus of the present invention, for example via an exhaust outlet.

The heat transfer means may take the form of heating conduits. These heating conduits may be positioned in the vicinity, or in intimate contact with the exterior of the reforming reactor. The heating conduits may be integral with the walls of the reforming reactor. In one embodiment, the heat transfer means takes the form of a plurality of spaced metal plates which are bonded to one another, for example, by diffusion bonding. The space between the plates may act as heating conduits. Alternatively or additionally, the surface of one or more of the plates may be etched or otherwise provided with channels (e.g. micro-channels).

The apparatus may also be provided with pre-heating units for heating the reactant feed for the reforming reactor. Alternatively or additionally, the apparatus may comprise a partial oxidation reactor, and/or a water-shift reactor. At least part of the product streams from the partial oxidation reactor and/or water-shift reactor may be passed through heat exchange means, so as to provide heat to the reforming reactor.

Apparatus for use in the present invention may be constructed as a series of reactors positioned within each other, preferably positioned concentrically within each other. For example, the combustion reactor is positioned within the reforming reactor, and the reforming reactor may be positioned within a pre-reformer reactor. These reactors may be interspaced with a plurality of heat transfer conduits, which are capable of transferring heat from a central region to a peripheral region of the apparatus. In use, an exhaust stream from the combustion reactor may be passed into the heat transfer conduits in the central region of the apparatus. The exhaust stream then flows through the conduits towards the outside. In doing so, heat is transferred from the core of the apparatus towards the periphery, allowing the outermost reactors to be at least partly heated by the exhaust stream. The exhaust stream is cooled in the process. By having this type of arrangement results in reduced heat losses to atmosphere and the process is thermally efficient.

These and other aspects of the present invention will now be described with reference to the accompanying drawings, in which:

FIG. 1 is a block diagram of an apparatus for carrying out an embodiment of the process of the present invention, and FIG. 2 is a schematic diagram of how heat can be transferred from one part of the apparatus of FIG. 1 to another.

Referring first to FIG. 1, the process of the present invention may be carried out using an apparatus comprising a plurality of pre-heating units 10, 12, 14, 16, 18, a steam reformer 20, a shift reactor 22, an oxidation unit 24, a cooler 26, a fuel cell stack 28 and a combustion chamber 30. The apparatus also comprises pre-reformer 32.

In use, a fuel 34 and water 36 (which may be from the fuel cell exhaust) are introduced into the first pre-heating unit 10, which heats the fuel and water to 120° C. From pre-heating unit 10, the feeds are passed to pre-heating unit 12 and then (shown as line 50) to pre-heating unit 14. Pre-heating unit 12 takes the temperature of the feed to 220° C., whilst pre-heating unit 14 takes the temperature to 500° C. Thus heated, the fuel 34 and water 36 are introduced into the pre-reformer 32, which converts any high hydrocarbons and any carbon monoxide present in the feed to methane. The heat generated by the pre-reforming step is used to heat one of the pre-heating units as indicated by line 38.

Once pre-reformed, the feed is less prone to cracking and/or coking at high temperatures. Thus, the pre-reformed feed can be heated in the pre-heating unit 16 to temperatures of 750° C. Thus heated, the feed is then introduced into the steam reformer 20, where it is contacted with a reforming catalyst (not shown). Under the reaction conditions, the fuel is reformed into a product stream 40 comprising hydrogen and a mixture of carbon monoxide and carbon dioxide. The energy required to drive this reforming reaction is provided by combusting the hydrogen-containing waste stream from the fuel cell stack 28, as will be described below.

The product stream 40 emerging from the reformer 20 is at 800° C. At least part of the heat energy in the product stream 40 can be used to heat the pre-heating unit 12. In doing so, the product stream 40 cools to a temperature 231° C.

The cooled product stream is passed as 52 to the shift reactor 22, where the stream is contacted with water and a water shift catalyst (not shown). The shift reactor 22 is operated under water shift conditions, such that any carbon monoxide in the product stream 40/52 is converted into carbon dioxide and hydrogen. The shift reaction is exothermic, and the heat generated may be used to heat a stream of air 42, before it enters the oxidation unit 24.

The effluent from the shift reactor 22 is then introduced into the oxidation unit 24. In the oxidation unit (PROX) 24, the shift reactor effluent is contacted with the heated air stream 42. The unit 24 is operated under partial oxidation conditions, so that any carbon monoxide present in the shift reactor effluent is preferentially oxidised to carbon dioxide. Most or all of the hydrogen in the shift reactor effluent remains unreacted.

The effluent from the oxidation unit 24 is at a temperature of 180° C. Thus, the effluent can be used to heat the pre-heating unit 18, before it is cooled further in the cooler 26 to a temperature of 80° C. The cooled effluent is then introduced to the fuel cell stack 28. The fuel cell stack 28 combines the hydrogen in the effluent with oxygen to produce electric power and water. The water produced is removed from the fuel cell 28 as a cathode waste stream (not shown), which may be used to feed the pre-heating unit 10. The fuel cell 28, however, is not 100% efficient, and some of the hydrogen remains unreacted. This unreacted hydrogen is removed as an anode waste stream 44, which is combusted in the combustion chamber 30 to produce water (steam). The reaction is highly exothermic, and the effluent (mainly steam) produced is at a temperature of 1000° C. This steam is used to heat the reformer 20. The reformer is positioned (preferably concentrically) within the reformer to effect this heat transfer.

Preferably to effect heat transfer the reformer is position (preferably concentrically) within the pre-reformer.

The heat generated in the combustion chamber 30 by the combustion of the anode waste stream 44 may be supplemented by heat generated by the combustion of an additional fuel stream 46. This additional fuel stream 46 may be pre-heated in the presence of air in the preheating unit 18.

FIG. 2 depicts how heat can be transferred from one part of the apparatus of FIG. 1 to another. As described in relation to FIG. 1, the effluent (mainly steam) emerging from the combustion chamber 30 (see FIG. 1) is at 1000° C. This effluent is used to heat the steam reformer 20, the pre-reformer 32, and the pre-heating units 14, 12, 10, 18. In so doing, the effluent loses heat. Thus, the effluent is at 800° C. on leaving the steam reformer 20, at 729° C. on leaving the pre-heating unit 16, at 670° C. on leaving the pre-reformer 32, at 598° C. on leaving the pre-heating unit 14, and at 528° C. on leaving the preheating unit 12. On leaving pre-heating units 10 and 18, the effluent is at 480° C. and 449° C., respectively. The effluent is then expelled from the apparatus as an exhaust stream.

As shown by the arrows a, b, and c, some of the feeds introduced into the apparatus are also heated to their desired temperature by the effluent from the combustion chamber 30.

In particular, the fuel 36 (see FIG. 1) is introduced into the pre-heating unit 10 at 20° C., and heated using at least some of the heat from the effluent from the combustion chamber 30 through to a temperature of greater than 800° C. (see arrows c). Similarly, the additional fuel 46 introduced into the pre-heating unit 18 is heated from 20° C. to 80° C. with the help of the combustion chamber effluent (see arrow a). Arrow b) shows how the air 42 introduced through the water shift reactor 22 is taken from a temperature of 20° C. to 180° C. with the help of the combustion chamber effluent.

The invention claimed is:

1. A process for producing hydrogen for a fuel cell, said process comprising:
   a) reacting a fuel comprising a hydrocarbon and/or an oxygenate with steam, under steam reforming conditions in a reforming reactor to produce a product stream comprising hydrogen,
   b) feeding at least part of the hydrogen produced in step a) to a fuel cell, to produce electric power and a waste stream comprising hydrogen,
   c) reacting at least part of the waste stream from step b) with an oxygen-containing gas in a combustion reactor positioned within the reforming reactor,
   d) using a first portion of the heat energy produced in step c) to supply energy to the steam reforming reaction in step a), and
   e) using a second portion of the heat energy from the effluent emerging from the combustion reactor of step c) to heat a feed to the process,
   wherein the fuel is pre-treated prior to the reforming step a) by pre-reforming in a pre-reformer to produce methane and further wherein the reforming reactor is positioned within the pre-reformer.

2. A process as claimed in claim 1 in which the combustion chamber is positioned concentrically within the reformer reactor.

3. A process as claimed in claim 1 in which the steam reforming step a) is performed at a temperature in the range from 1 to 30 bara.

4. A process as claimed in claim 3 in which the steam reforming step a) is performed at a pressure greater than atmospheric pressure.

5. A process as claimed in claim 1 in which the Steam reforming step a) is performed at a temperature in the range from 700 to 1000° C.

6. A process as claimed in claim 4 in which the steam reformer is operated in excess of 2 bara and hydrogen from step a) is purified using a membrane before being introduced into the fuel cell.

7. A process as claimed in claim 1 in which the hydrogen is fed to a storage system.

8. A process as claimed in claim 2 in which the steam reforming step a) is performed at a pressure in the range from 1 to 30 *bara*.

9. A process as claimed in claim 2 in which the steam reforming step a) is performed at a temperature in the range from 700 to 1000° C.

10. A process as claimed in claim 2 in which the product stream produced in step a) comprises carbon monoxide and in which said carbon monoxide is converted to carbon dioxide in one or more of the reactions selected from the group consisting of (i) reacting with an oxygen-containing gas to produce carbon dioxide, (ii) reacting with steam to produce carbon dioxide and hydrogen and (iii) contacting with an oxygen-containing gas under partial oxidation conditions to oxidize carbon monoxide in preference to hydrogen.

11. A process as claimed in claim 2 in which the hydrogen is fed to a storage system.

12. A process as in claim 7 wherein the hydrogen storage system comprises a tank, a metal hydride or both.

13. A process as in claim 11 wherein the hydrogen storage system comprises a tank, a metal hydride or both.

14. A process as for producing hydrogen for a fuel cell, said process comprising:
   a) reacting a fuel comprising a hydrocarbon and/or an oxygenate with steam under steam reforming conditions in a reforming reactor to produce a product stream comprising hydrogen,
   b) feeding at least part of the hydrogen produced in step a) to a fuel cell to produce electric power and a waste stream comprising hydrogen,
   c) reacting at least part of the waste stream from step b) with an oxygen-containing gas in a combustion reactor positioned within the reforming reactor,
   d) using a first portion of the heat energy produced in step c) to supply energy to the steam reforming reaction in step a), and
   e) using a second portion of the heat energy from the effluent emerging from the combustion reactor of step c) to heat a feed to the process, wherein the product stream produced in step a) comprises carbon monoxide and in which said carbon monoxide is converted to carbon dioxide in one or more of the reactions selected from the group consisting of (i) reacting with an oxygen-containing gas to produce carbon dioxide, (ii) reacting with steam to produce carbon dioxide and hydrogen and (iii) contacting with an oxygen-containing gas under partial oxidation conditions to oxidize carbon monoxide in preference to hydrogen, in which heat produced in one or more of steps (i), (ii) and (iii) is used as a source of energy for the steam reforming step a).

* * * * *